(12) United States Patent
Masterson et al.

(10) Patent No.: US 8,102,916 B1
(45) Date of Patent: Jan. 24, 2012

(54) DYNAMICALLY CHANGING MEDIA COMPRESSION FORMAT IN COMPRESSED DOMAIN

(75) Inventors: Anthony D. Masterson, Saratoga, CA (US); Amir M. Mobinl, San Francisco, CA (US)

(73) Assignee: Zenverge, Inc., Cupertino, CA (US)

( * ) Notice: Subject to any disclaimer, the term of this patent is extended or adjusted under 35 U.S.C. 154(b) by 1441 days.

(21) Appl. No.: 11/448,447

(22) Filed: Jun. 6, 2006

Related U.S. Application Data

(60) Provisional application No. 60/758,776, filed on Jan. 12, 2006.

(51) Int. Cl.
*H04N 7/12* (2006.01)
(52) U.S. Cl. ......... 375/240.16; 375/240.18; 375/240.24; 375/240.25; 375/240.26
(58) Field of Classification Search ............. 375/240.18, 375/240.16, 240.24–240.26
See application file for complete search history.

(56) References Cited

U.S. PATENT DOCUMENTS

| | | | |
|---|---|---|---|
| 5,467,134 A | 11/1995 | Laney et al. | |
| 5,544,266 A | 8/1996 | Koppelmans et al. | |
| 5,838,597 A | 11/1998 | Pau et al. | |
| 6,272,180 B1 | 8/2001 | Lei | |
| 6,434,197 B1 * | 8/2002 | Wang et al. ............... | 375/240.29 |
| 7,116,830 B2 | 10/2006 | Srinivasan | |
| 7,143,432 B1 | 11/2006 | Brooks et al. | |
| 2003/0028643 A1 | 2/2003 | Jabri | |
| 2003/0198293 A1 | 10/2003 | Chen et al. | |
| 2005/0053141 A1 | 3/2005 | Holcomb et al. | |
| 2005/0232497 A1 | 10/2005 | Yogeshwar et al. | |
| 2005/0276323 A1 | 12/2005 | Martemyanov et al. | |
| 2005/0281332 A1 | 12/2005 | Lai et al. | |
| 2006/0072662 A1 | 4/2006 | Tourapis et al. | |
| 2007/0036218 A1 | 2/2007 | Burazerovic | |

OTHER PUBLICATIONS

De With, P.H.N. et al., "An MPEG Decoder with Embedded Compression for Memory Reduction," IEEE Transactions on Consumer Electronics, Aug. 1998, pp. 545-555, vol. 44, No. 3.
Lee, T.Y., "A New Frame-Recompression Algorithm and its Hardware Design for MPEG-2 Video Decoders," IEEE Transactions on Circuits and Systems for Video Technology, Jun. 2003, vol. 13, No. 6, pp. 529-534.
"MPEG-2—The basics of how it works," Hewlett Packard, published at least as early as Oct. 31, 1999, 17 pages.
PCT International Search Report and Written Opinion, PCT/US09/32138, Mar. 25, 2009, 8 pages.
"Streaming Live MPEG-4, The VBasics," VBrick Systems, Inc., 2003, 13 pages.
U.S. Office Action, U.S. Appl. No. 11/611,356, Sep. 16, 2009, 18 pages.
U.S. Office Action, U.S. Appl. No. 11/611,356, Apr. 16, 2009, 20 pages.

(Continued)

*Primary Examiner* — Jay Au Patel
*Assistant Examiner* — Geepy Pe
(74) *Attorney, Agent, or Firm* — Fenwick & West LLP

(57) ABSTRACT

An integrated circuit receives a compressed input stream having a first compression format. A media processing module converts the compressed input stream to an intermediary compression format for processing without fully decompressing the compressed input stream. After processing, a compressed output stream having a second compression format is generated from the intermediary compression format. Processing is dynamically adjusted responsive to changing network conditions. Optionally, the integrated circuit can receive live, raw video, partially encode it into the intermediary compression format, process it with the media process module as well as take the intermediary compression format, decode and output the live, raw video.

21 Claims, 13 Drawing Sheets

OTHER PUBLICATIONS

Wee, S. et al, Compression-Domain Video Processing, Hewlett-Packard Company, 2002, pp. 1-35.
United States Office Action, U.S. Appl. No. 11/611,356, Dec. 10, 2009, 20 pages.
United States Office Action, U.S. Appl. No. 11/567,678, Apr. 29, 2011, 15 pages.
United States Office Action, U.S. Appl. No. 11/486,190, Apr. 25, 2011, 9 pages.
United States Office Action, U.S. Appl. No. 11/486,190, Dec. 17, 2010, 8 pages.
United States Office Action, U.S. Appl. No. 11/567,678, Oct. 18, 2011, 13 pages.

* cited by examiner

DYNAMICALLY CHANGING MEDIA COMPRESSION FORMAT IN COMPRESSED DOMAIN

RELATED APPLICATIONS

This application claims the benefit of U.S. patent application Ser. No. 60/758,776 entitled "Manipulation of Media Streams in the Compressed Domain", filed on Jan. 12, 2006, which is incorporated by reference herein in its entirety.

FIELD OF THE INVENTION

The present invention relates generally to computer processors, and more specifically, to a processor to operate on compressed streams of digital media.

BACKGROUND

Conventionally, multimedia such as video and audio has been delivered using analog delivery mediums such as NTSC (National Television System Committee) signals, and has been stored using analog storage mediums such as video cassette recorders. The analog signals typically contain uncompressed frames of video. Thus, a significant part of the electronic components in a display device are dedicated to analog receiving hardware, and if the display device has a digital output, electronic components are needed to convert the analog signal to a digital signal. With the advent of digital delivery mediums, such as ATSC (Advanced Television Systems Committee) signals, and of digital storage mediums and DVDs, multimedia can be delivered and stored using pure digital signals. Digital signals typically contain compressed frames of video.

Meanwhile, consumers and business have an increasing number of digital playback devices such as high-definition televisions, digital video recorders, MP3 players and the like. However, the digital playback devices are typically independent of each other. Furthermore, the digital playback devices are likely to use a digital format that is optimized for particular storage and playback capabilities. For example, a high-definition television can use a conventional high-definition signal, but a standard-definition television or a portable video player typically uses a digital signal with different characteristics. Differences in digital formats can include encoding, bit rate, resolution, and the like.

Due to differences in conventional playback devices, there are limits in the types of digital formats that can be input and output from the devices. In order to handle more digital formats, the complexity of related hardware increases exponentially. One reason for this is that the digital formats are typically decompressed in order to perform operations in the spatial domain to make use of legacy analog techniques which operate on decompressed video. Decompressed multimedia, especially video, requires bulky processing hardware to handle the high bandwidth for data transfers. Decompressed video also requires significant amounts of storage.

A particular need in digital media applications involves changing media from a first compression format into a second compression format. Such a need may arise, for example, when a digital media broadcast feed is in a format that is not compatible with a certain playback system. The need to change digital media formats is becoming increasingly pervasive as more digital broadcast, distribution, storage, processing, and playback systems are brought into use.

Traditional approaches involve decoding media from a first compression format to a complete uncompressed representation of the media and then encoding the uncompressed representation into a second compression format. Such a process has several major drawbacks. For example, it is computationally expensive. Encoding media streams, in particular, is a complicated task that requires significant processing resources to achieve in real-time. In addition, changing media formats through complete decompression requires additional bandwidth, as the uncompressed representation of the media typically requires more storage space than either the first media in the first compression format or media in the second compression format.

Therefore, there is a need for systems and methods to efficiently change media of a first compression format to media of a second compression format.

SUMMARY

The present invention includes systems and methods for changing the format of a media stream while compressed. In one embodiment, a compressed input stream is received having a first compression format. The compressed input stream is converted to an intermediate compressed domain format (i.e., an intermediate format) for processing without fully decompressing the compressed input stream. After processing, a compressed output stream having a second compression format is generated from the intermediate compressed domain format. In one embodiment, multiple streams of video are input and/or output at the same time.

One embodiment of the media processing module operates entirely in the compressed domain without decompressing frames of media streams to raw pixels, or a spatial domain. The processing can include, for example, image enhancement, scaling, bit rate adjustments, encoding, and the like.

Another embodiment of the media processing module operates partially in the compressed domain and partially in the spatial domain. Processing steps such as image enhancement, scaling, bit rate adjustments, and encoding can be performed in either the compressed or spatial domain according to various embodiments.

Advantageously, the method according to one embodiment handles multiple types of digital media formats in real time. Furthermore, the method has improved performance by keeping media streams compressed while processing. Processing efficiency in the compressed domain of compressed video is much greater than in the spatial domain of decompressed video. Another method has improved performance by processing media streams partially in the compressed domain and partially in the spatial domain. Moreover, processing can be dynamically adjusted responsive to changing network conditions.

Processing media streams at least partially in the spatial domain provides efficient compliance with certain media standards. For example, some media standards specify steps such as intra-prediction and deblock filtering, which can be efficiently implemented in the spatial domain. A hybrid processing configuration can advantageously process in the compressed domain those steps of the standard that can be efficiently processed in the compressed domain while processes in the spatial domain those steps of the standard that can be efficiently processed in the spatial domain.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for processing compressed streams of digital media are described. A compressed input stream can be compressed according to various protocols. In some cases, intra-frame compression and inter-frame compression is performed such that the frame is compressed individually, and with respect to surrounding frames. A compressed output stream can be compressed according to the same format or a different format, and according to the same parameters or different parameters, relative to the compressed input stream. During processing of the input stream to generate the output stream, full decompression of frames is not required.

Figure 1:
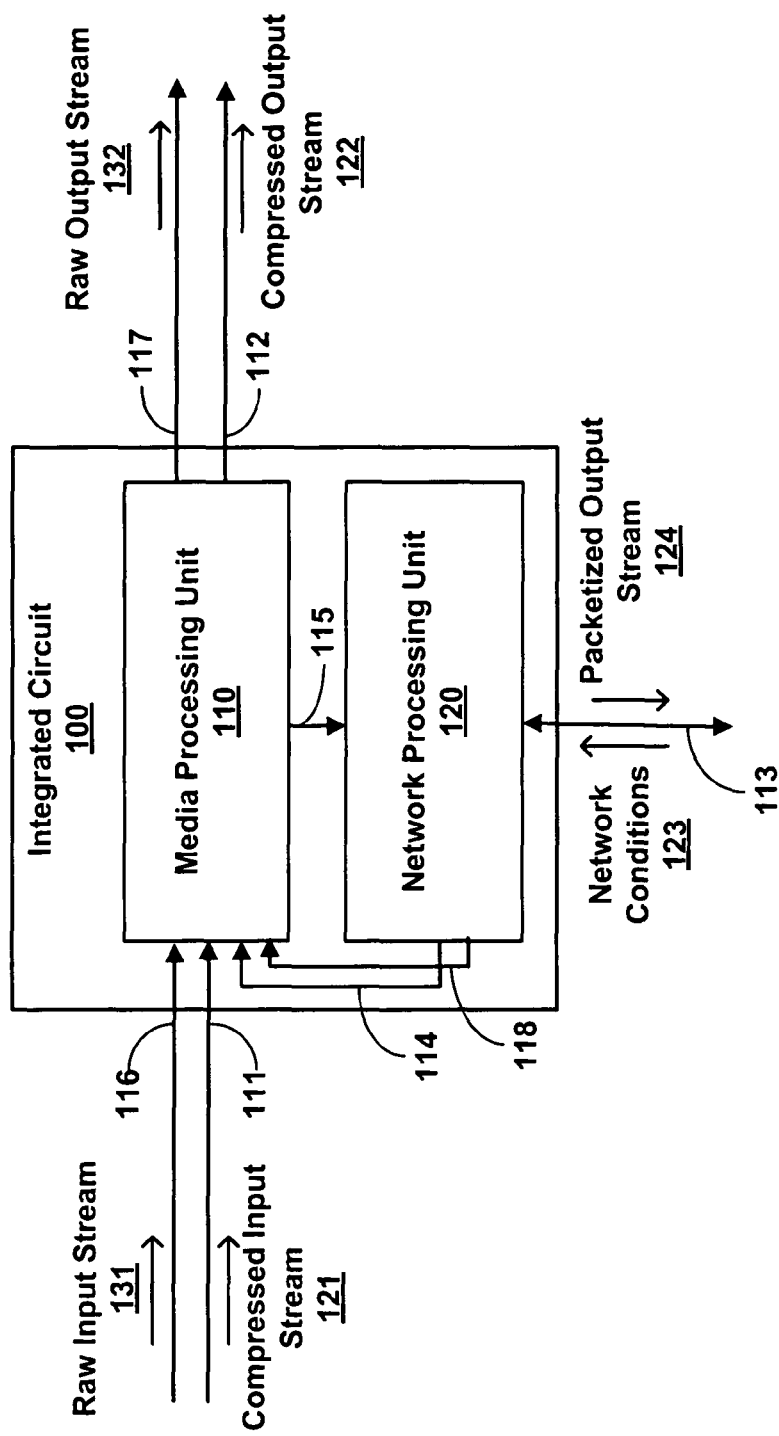
FIG. 1 is a block diagram of an integrated circuit for processing streams of media that remain compressed during processing according to one embodiment of the present invention.

FIG. 1 is a block diagram of an integrated circuit 100 for processing streams of media that remain compressed during processing. Although the embodiment of FIG. 1 is described with reference to integrated circuit 100, other embodiments of a receiver module can be implemented, for example, across several integrated circuits or partially in software. Integrated circuit 100 comprises a media processing unit 110 and a network processing unit 120. Integrated circuit 100 can be implemented on a silicon wafer or other suitable material. In one embodiment, integrated circuit 100 is configured with multiple processing cores and the media and network processing units 110, 120 each operate from a dedicated core. Integrated circuit 100 can be part of, for example, a system for distributing high-definition audio/video signals from a video server or set-top box as described below in association with FIG. 5.

It is noted that some of the embodiments described herein are described with respect to processing in the compressed domain. However, processing in the compressed domain is merely an example of many possible variations. More specifically, some embodiments of integrated circuit 100 can process entirely in the compressed domain. Some embodiments can have a hybrid processing environment in which portions of processing (such as image scaling or reference frame processing) are performed entirely in the compressed domain and other portions of processing (such as intra-prediction or deblock filtering) are performed in the spatial domain. Processing in the spatial domain can include, for example, either partially decompressing or completely decompressing part of or all of a media stream.

A benefit of those embodiments in which at least some processing is performed in the spatial domain includes efficient compliance with conventional standards that specify processing in the spatial domain. By processing at least partially in the spatial domain, compliance with standards can be maintained for appropriate parts of the processing path, while advantageously processing at other parts of the path in the frequency domain to take advantage of such processing features as disclosed herein. Some embodiments perform processing entirely in the compressed domain, and can be flexibly configured to be compliant with standards that specify processing in the spatial domain. Other embodiments have a hybrid processing environment using partially the frequency domain and partially the spatial domain.

Integrated circuit 100 includes an input/output (I/O) coupled to signal lines 111, 112, 113 respectively. Media processing unit 110 is coupled to line 121 for receiving a compressed input stream 121 and/or raw video and output input streams 131, and is coupled to line 112 for sending an compressed output stream 122 and/or raw video and audio output streams 132. Network processing unit 120 is coupled to line 113 for sending and receiving network packets. Media processing unit 110 is communicatively coupled with network processing unit 120 via line 115 to send the compressed output stream, and via line 114 to receive network conditions as a feedback. Depacketized streams of media (i.e., media streams unpacked from network data packets) are sent over line 118.

Media processing unit 110 is adapted to convert compressed input stream 121 to compressed output stream 122. Input and compressed output streams 121, 122 can be encoded formatted under various audio/video protocols such as, MPEG-2, MPEG-4, MP3, H.263, H.264, AVI, a RealVideo format, a Windows Media Player format, other video formats, other audio formats, and the like. Input and output raw streams can include raw HDTV, RGB, YCrCb video such a SMPTE 276 or 292, raw standard definition YCrCb video such as CCIR 656, other video formats, other audio formats, and the like. The formats can vary in characteristics such as bit rate and resolution. For example, a high-definition television signal using MPEG2 can be converted by media processing unit 110 to a standard-definition television signal to match display capabilities of the receiving device. The conversion can include one or more of transcoding, transrating, and transcaling, and the like. Additional processing such as image enhancement can also be performed. As will be apparent to one of skill in the art, the types of media discussed herein are intended to be exemplary, and other forms of compressed media and/or data may be used without departing from the scope of the present invention.

In one embodiment, conversions are performed primarily (either partially or completely) in the compressed domain (i.e., using compressed frames), without the need for translation to the spatial domain (i.e., using uncompressed frames, or raw pixels). A frequency domain is one such example of a compressed domain, but other examples will be apparent to one of skill in the art without departing from the scope of the present invention. In one example, compressed input stream 121 is processed and output as either compressed output stream 122, raw output stream 132, or packetized output stream 124. In another example, raw input stream 131 is processed and output according to the same options. In another embodiment, media processing unit 110 can adjust conversion parameters responsive to network conditions that are fed back.

Network conditions can comprise information related to, for example, network latency, number of network hops, and decoding capabilities of network devices. For example, in response to relatively small network bandwidth the high-definition television signal can be reduced below standard-definition. In another embodiment, media processing unit 110 can dynamically adjust conversion parameters responsive to changing network conditions. One embodiment of media processing unit 110 is described in further detail below with reference to FIG. 2.

Network processing unit 120, at a high-level, is configured to packetize media streams and determine conditions associated with a network. In packetizing media streams, network processing unit 120 can convert data contained in output media signal 122 to network packets. Packetized output stream 124 can comprise TCP/IP packets, ATM packets, and the like. One embodiment of network processing unit 120 is described in further detail below with reference to FIG. 4.

Figure 2:
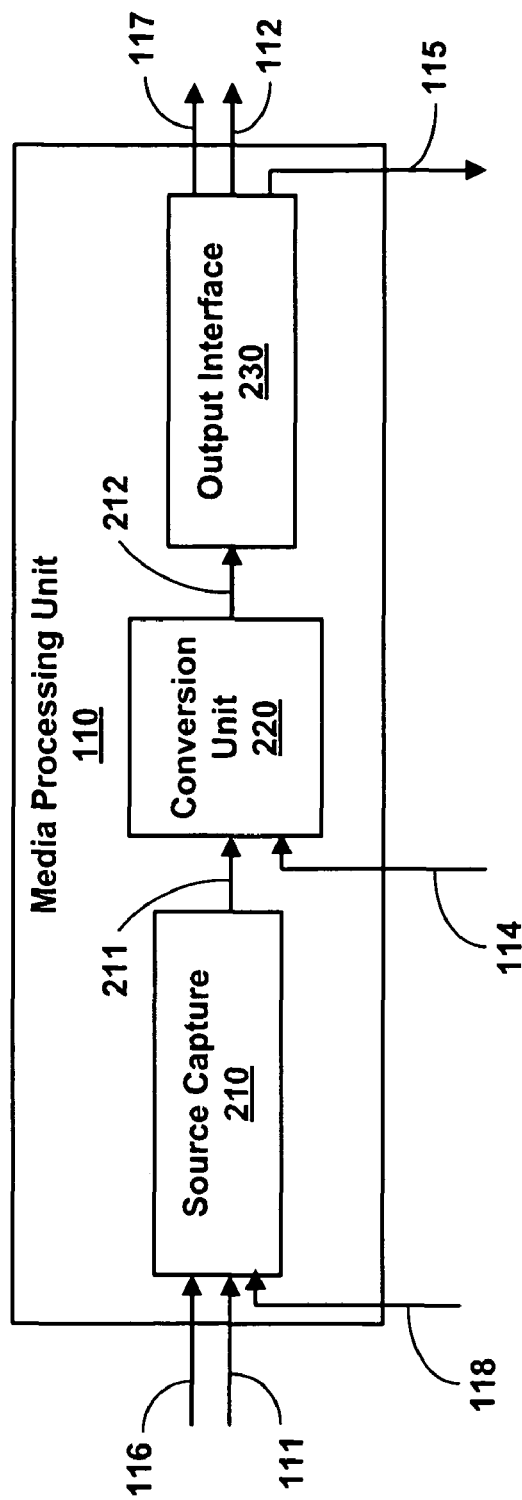
FIG. 2 is a block diagram illustrating a media processing unit of the integrated circuit according to one embodiment of the present invention.

FIG. 2 is a block diagram illustrating one embodiment of media processing unit 110 (FIG. 1) in further detail. Media processing unit 110 comprises a source capture 210, a conversion unit 220, and an output interface 230. Source capture 210 is coupled to conversion unit 220 via line 211, and conversion unit 220 is coupled to output interface 230 via line 212. According to one embodiment of the present invention, the various components of the media processing unit 110 can operate in either compressed or spatial domains.

Source capture 210 is coupled to receive and temporarily buffer compressed and/or raw input signals 121, 131 (e.g., in DRAM or SRAM). Source capture 210 can also receive input signals sourced by remote devices over line 118. In some embodiments, source capture 210 and output interface 230 can also perform various functions such as color space conversion, sample rate conversion, demodulating, digitizing, decoding, decryption, and the like. Source capture 210 will convert raw input signal 131 into the intermediary compression format. Output interface 230 is coupled to temporarily buffer and send compressed and/or raw output signals 122, 132. Output interface 230 will convert from the intermediary compression format to raw output signal 132. In some embodiments, output interface 230 can also provide functions such as an On Screen Display (OSD) overlay, Picture In Picture (PIP), and DVD subpicture overlay.

Figure 3:
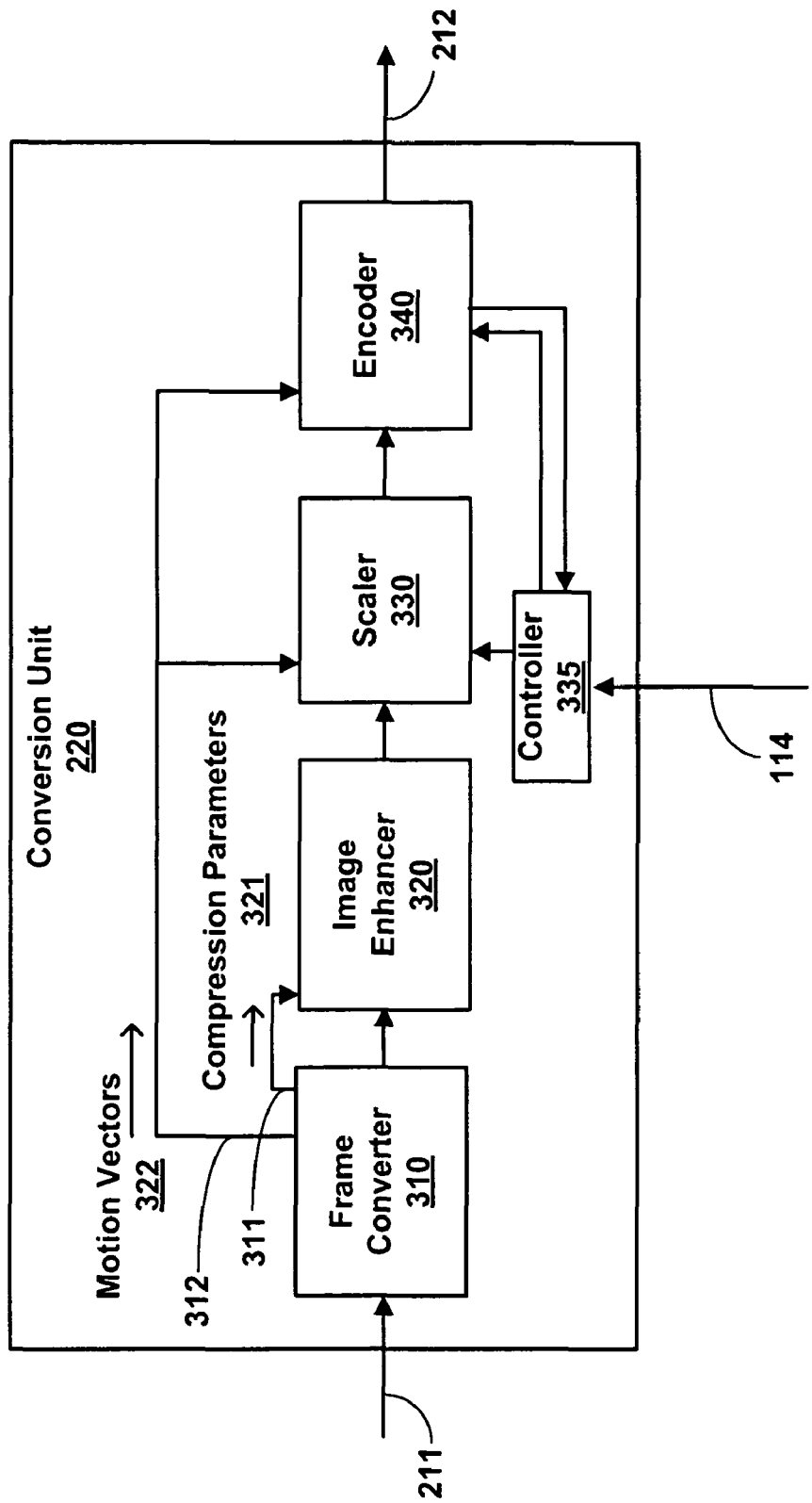
FIG. 3 is a block diagram illustrating a conversion unit of the media processing unit according to one embodiment of the present invention.

Conversion unit 220 is coupled to receive network conditions fed back via line 114. One embodiment of conversion unit 220 is shown in the block diagram of FIG. 3. Conversion unit 220 includes a pipeline of processing components. A frame converter 310, an image enhancer 320, a scaler 330, and an encoder 340, are sequentially coupled to each other. Frame converter 310 is also communicatively coupled to image enhancer 320 via line 311, and to scaler 330 and encoder 340 via line 312. Generally, conversion unit 220 transforms frames in compressed input stream 121 from a first compression format to an intermediary compression format. The intermediary compression format is a common format used by conversion unit 220 to perform manipulations as further described below. Conversion unit 220 then transforms frames from the intermediary compression format to a second compression format. A method for converting an input media stream in a first compression format to an intermediate media stream and then to an output media stream in a second compression format is described herein with reference to FIG. 9. In one embodiment, conversion unit 220 includes a controller (not shown) to manage the pipeline and determine compression parameters. The controller can also adjust pipeline operations in response to the network conditions.

Frame converter 310 performs the conversion from the first compression format to the intermediary compression format. In one embodiment, frame converter 310 selects an appropriate conversion table to map control and data fields between formats. The intermediary format can be a reference frame that is similar to an I-frame in that the frames are compressed (i.e., intra-compressed), but is independent of preceding or following frames (i.e., not inter-compressed). Thus, a media stream containing B-frames and P-frames, which depend on preceding and/or following frames, is decoded into self-decoding frames of the intermediary format.

The intermediary compression format describes frames in a compressed domain, rather than the spatial domain, thereby allowing more efficient operations and significantly less memory usage. In one embodiment, the intermediary compression format (i.e., the intermediate compressed domain format) can be encoded with uniform block sizes for more efficient processing of input and compressed output streams that use variable block sizes. Frame converter 310 extracts information during compression such as motion vectors and compression parameters that are fed to components further down the pipeline. Various features such as a deblock filter can be partially performed in the spatial domain. A method used by the frame converter 310, according to one embodiment of the present invention, is described herein with reference to FIG. 10.

Image enhancer 320 processes frames in either a compressed or spatial domain. In one embodiment, the processing removes mosquito noise, blockiness and other artifacts, and can deinterlace field-based images. Mosquito noise is a time dependent video compression artifact related to quantization. In one embodiment, image enhancement unit receives compression parameters from frame converter 310 to optimize quality.

Scaler 330 is configured to implement transcaling in either a compressed or spatial domain. Transcaling is performed by converting frames from a first frame size (e.g., 1080 i) to a second frame size (e.g., 480 p). In one embodiment, scaler 330 is coupled to a controller 335 to receive network conditions. Transcaling parameters can be adjusted in accordance with network conditions.

Encoder 340 is configured to implement transcoding in the frequency and spatial domains. Transcoding is performed by converting between multiple types of protocols (i.e., from the first compression format to the second compression format via the intermediary compression format), in the frequency and spatial domains. Encoder 340 can select an appropriate conversion table and mechanism for mapping the intermediary compression format to the second compression format. In one embodiment, encoder 340 is coupled to receive network conditions from controller 335, and can adjust transcoding parameters in accordance with the network conditions. Controller 335 can also make adjustments to encoding parameters based on feedback from encoder 340 (e.g., data rate feedback). A method used by the encoder 340, according to one embodiment of the present invention, is described herein with reference to FIG. 11.

In one embodiment, encoder 340 can also implement transrating in the compressed domain. That is, while the compressed input stream can be encoded according to a first bit rate (e.g., 1.2 Mb/s) and frame rate (e.g., 30 fps), the compressed output stream can be reduced (or increased) to according to a second bit rate (e.g., 56 kb/s) and frame rate (e.g., 10 fps). The first bit rate can be a number of bytes per second needed to display frames at a predetermined rate. In one embodiment, control unit can determine the second bit rate and frame rate based on the network conditions.

Figure 4:
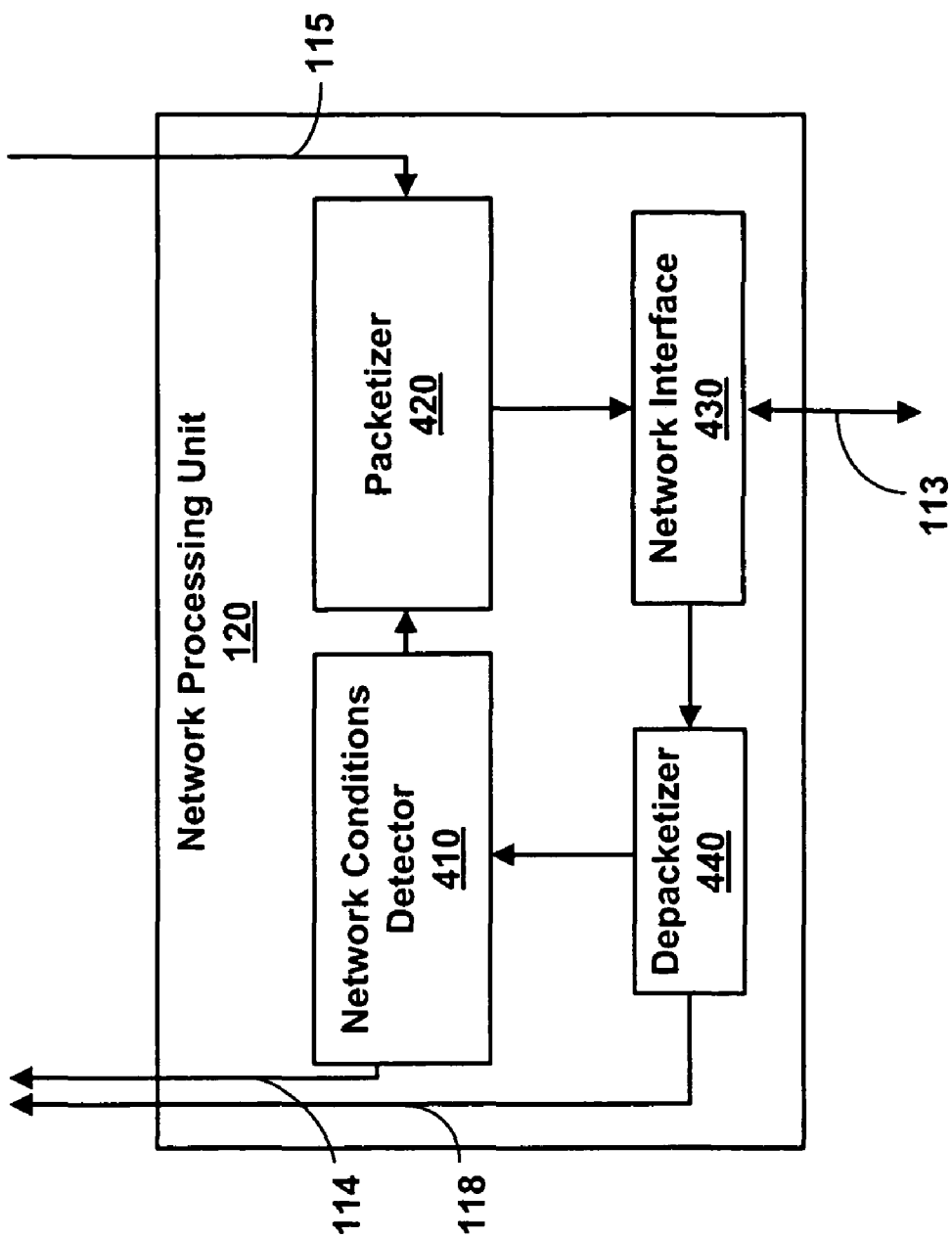
FIG. 4 is a block diagram illustrating a network processing unit of the integrated circuit according to one embodiment of the present invention.

FIG. 4 is a block diagram illustrating network processing unit 120 of integrated circuit 100 (FIG. 1) in further detail. Network processing unit 120 comprises a network conditions detector 410, a packetizer 420, a network interface 430, and a depacketizer 440, each coupled in communication. Note that the specific couplings illustrated in FIG. 4 are related to the data flow described, but couplings can have alternate configurations (e.g., each component can be coupled to each other through a single bus).

Network conditions detector 410 sends probe packets and receives response data packets via depacketizer 440. Also, network conditions detector 410 sends network conditions for use as described above. In one embodiment, network conditions detector 410 generates the probe packets to actively test various network conditions. Network conditions detector 410 examines the response packets for results. For example, a networked device can be pinged to determine network latency. In another example, a number of hops to a remote (i.e., networked) device can be determined. In still another example, display characteristics of a networked device can be detected.

Packetizer 420 receives compressed output stream 122 and/or raw output stream 132 and outputs packetized output stream 124. In one embodiment, packetizer 420 embeds compressed output stream 122 and/or raw output stream 132 into a format appropriate for the medium (e.g., TCP/IP packets for a LAN) to generate packetized output stream 124. Several compressed output streams 122 and/or raw output streams 132 can be serviced at the same time. In another embodiment, packetizer 420 can make adjustments responsive to network conditions received from network conditions detector 420. For example, packet transmission can be temporarily suspended due to a buffer overflow at a remote device. Similarly, depacketizer 440 receives packetized streams over line 113. Depacketizer 440 can unpack the embedded streams. The streams are sent to media processing unit 110 over line 118 for processing and output. Depacketizer 440 can provide client capabilities to integrated circuit 100, allowing output to a display sourced by, for example, a remote server. Depacketizer 440 can send unpacked streams over line 118.

Network interface 430 sends and receives physical signals (e.g., electrical or electro magnetic signals) via line 113. Network interface 430 can be, for example, a radio transceiver (i.e., for wireless connections) or an Ethernet NIC (Network Interface Card) card. In one embodiment, network interface 430 provides a communication channel for sending probe data packets and receiving response data packets. Additionally, network interface 430 can send and receive data packets containing compressed and/or raw input and output streams.

Figure 5:
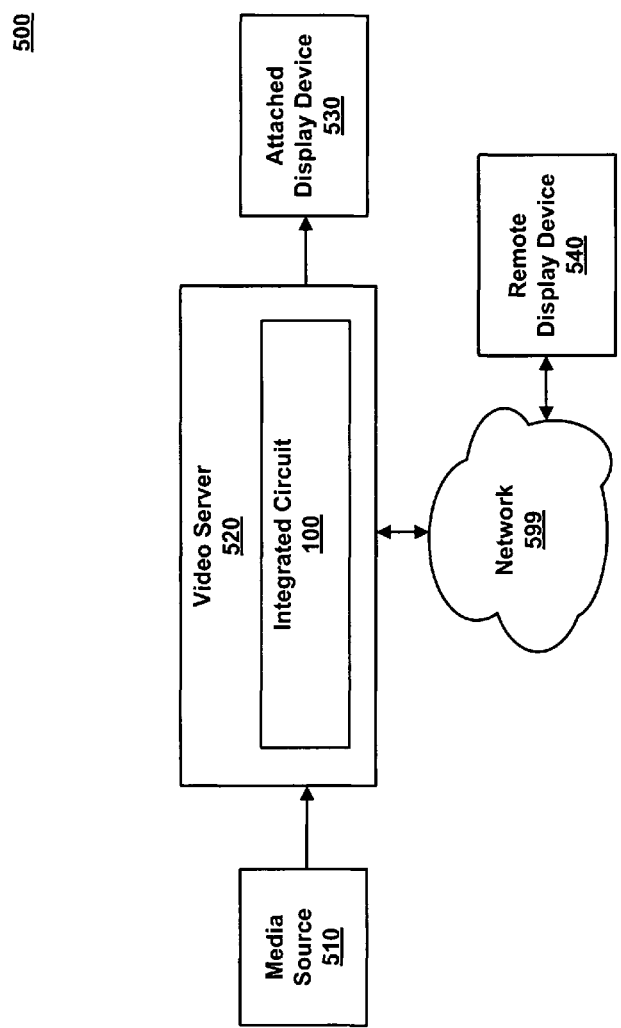
FIG. 5 is a block diagram illustrating a system for video distribution using the integrated circuit according to one embodiment of the present invention.

FIG. 5 is a block diagram illustrating a system 500 for video distribution using integrated circuit 100 according to one embodiment of the present invention. System 500 comprises a video server 520 with integrated circuit 100 which is coupled to a media source 510, an attached display device 530, and a remote display device 540 through a network 599.

Video server 520 receives compressed and/or raw input stream 121, 131 from media source 510. Video server sends compressed output stream and/or raw 122, 132 to attached display device 530 and remote display device 540. In one embodiment, video server 520 can further comprise components (not shown) such as a mother board, a hard drive, and the like. The media source (e.g., a cable provider or a DVD player) produces a data stream in a first compression format for distribution by video server 520. Video server 520 can simultaneously produce compressed output stream 122 in a second compression format and packetized output stream compressed output stream 124 in a third compression format. In another embodiment, video server 520 produces multiple compressed or raw output streams 122, 132 or multiple packetized output streams 124 (i.e., either in the same or different compression formats). The various outputs can be from the same or from different media sources 510. Thus, video server 520 is capable of simultaneously processing multiple inputs and multiple outputs.

Attached display device 530 can be any output device directly connected to video server 520 (e.g., via a IEEE 1394, USB, or DVI cable). Attached display device 530 can have various display capabilities. For example, a high-definition television can have a resolution of 1080 p or 720 P or a portable video player can have a resolution of 320 by 240 which determines transcaling parameters of integrated circuit 100. The high-definition television can include an MPEG 2 decoder which determines transcoding parameters of integrated circuit 100.

Remote display device 540 can be any output device capable of communicating with video server 520 through network 599. For example, remote display device 540 can be a conventional television with a set-top box having network capabilities. The set-top box can contain a client to enhance communications with video server 520. In another example, remote display device 540 can also have integrated networking capabilities. In addition to the display capabilities already described, remote display device 540 can have a low bandwidth network connection which determines transrate parameters of integrated circuit 100.

Figure 6:
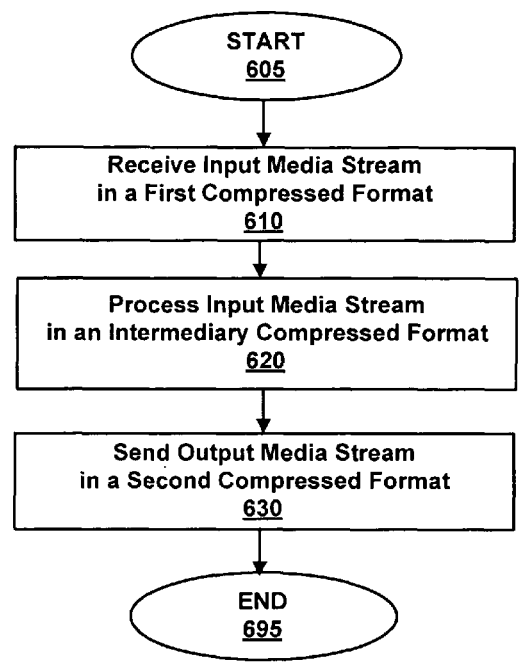
FIG. 6 is a high-level flow chart illustrating a method for generating compressed output streams according to one embodiment of the present invention.

FIG. 6 is a flow chart illustrating a method 600 for generating compressed output streams according to one embodiment of the present invention. A compressed input stream (e.g., compressed input stream 121) is received 610 in a first compression format (e.g., by integrated circuit 100).

The compressed input stream is processed 620 in an intermediary compression format (e.g., by media processing unit 110) as described below with reference to FIG. 7. Because frames of all formats can be converted to the intermediary format, regardless of how the frames were received or will be sent, the integrated circuit can be optimized for the intermediary format. For example, the intermediary format can use a uniform block size, and associated components can be designed specifically for the block size.

A compressed output stream (e.g., compressed output stream 112) is sent 630 in a second compression format (e.g., by network processing unit 120) as described below with reference to FIG. 8. In some embodiments, more than one input stream is processed, and in other embodiments, more than one output stream is output. The output stream can be sent to an attached display device (e.g., attached display device 530) or a remote display device (e.g., remote display device 540). In another embodiment, the output can be transferred to a storage medium for a time-shifted playback.

Figure 7:
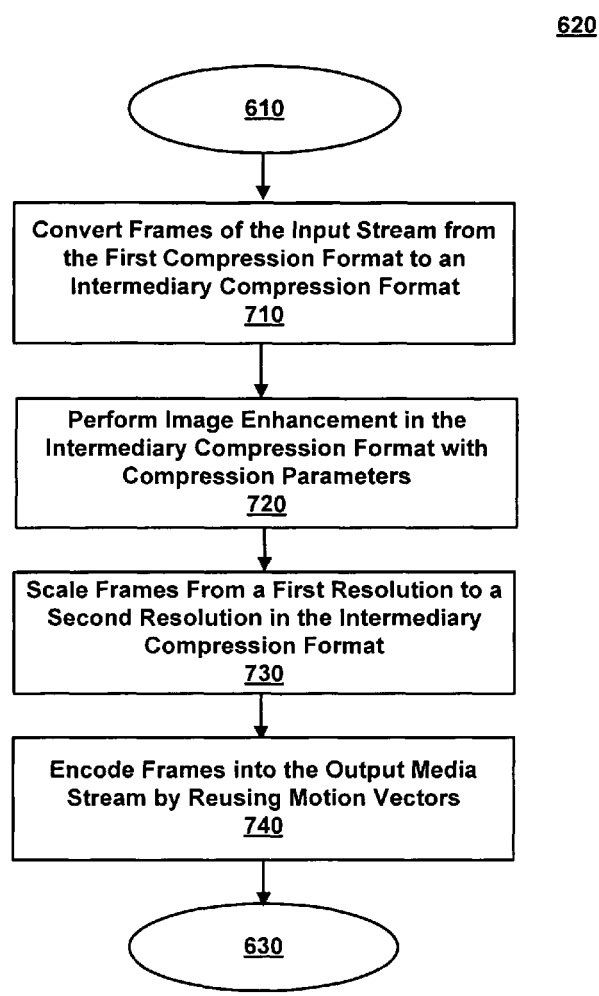
FIG. 7 is a flow chart illustrating a method for processing media streams that remain compressed during processing according to one embodiment of the present invention.

FIG. 7 is a flow chart illustrating a method 620 for processing media streams that remain compressed during processing according to one embodiment of the present invention. Because the frames remain compressed during processing, additional hardware (e.g., processing and storage resources) for decompression to the spatial domain, and additional hardware for storing the relatively large decompressed frames, is not necessary.

Frames of the input stream are converted 710 from the first compression format to an intermediary compression format (e.g., in frame converter 310). When the conversion occurs, motion vectors and other compression parameters are extracted from the input stream. Generally, the motion vectors describe the motion of objects between frames. For example, a football trajectory can be described using mathematical vectors. Also, compression parameters can describe high and low frequency components that can cause artifacts such as mosquito noise or blockiness due to quantization.

Image enhancement is performed 720 in the intermediary format with compression parameters (e.g., by image enhancer 320). During image enhancement, frames are processed to remove noise and optionally deinterlace video. The compression parameters provide indications of how artifacts will manifest.

Frames are scaled 730 from a first resolution to a second resolution while in the intermediary format (e.g., by scaler 330). In one embodiment, the frames can use network conditions to determine the second resolution.

Frames are encoded 740 into the compressed output stream by reusing motion vectors (e.g., by encoder 340). The motion vectors can be reformatted for differences between the input and output streams. For example, if frames have been downsized, then the motion vector can be reoriented accordingly. In the example of the football trajectory, the general shape of the trajectory will remain the same while the height and distance of the trajectory are downsized. In one embodiment, network conditions affect encoding parameters. For example, a bit rate and frame rate of encoded frames can be set according to a minimum network bandwidth.

Figure 8:
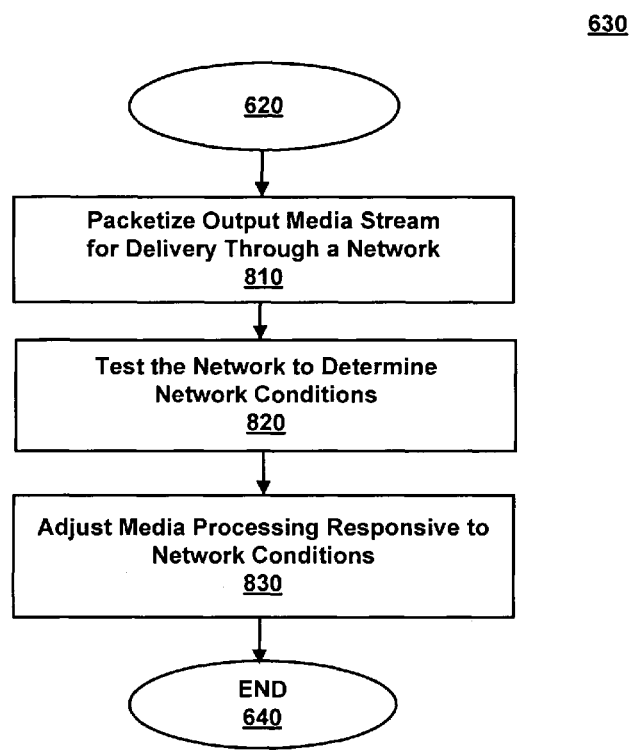
FIG. 8 is a flow chart illustrating a method for adjusting the compressed output stream, responsive to network conditions, according to one embodiment of the present invention.

FIG. 8 is a flowchart illustrating a method 630 for generating output media signal, responsive to network conditions, according to one embodiment of the present invention. The compressed output stream is packetized 810 for delivery (e.g., by packetizer 420) through a network (e.g., network 599). Network conditions can be discovered using various techniques such a pinging and trace routing. The media processing can be adjusted 830 responsive to network conditions.

Figure 9A:
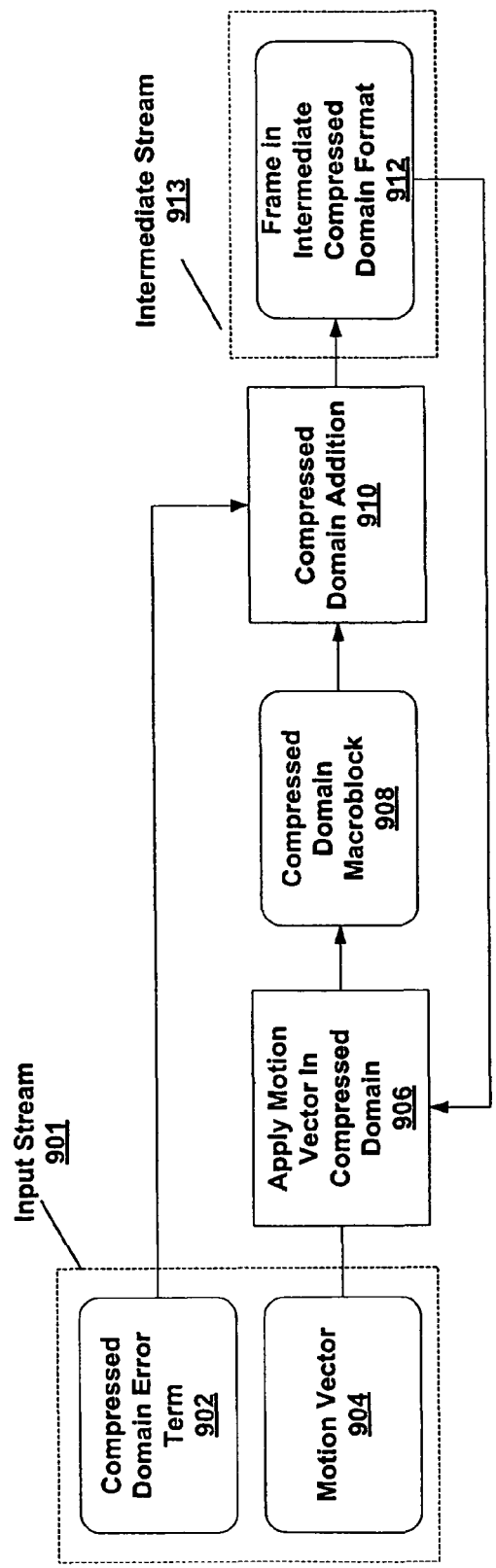
FIGS. 9(a) and 9(b) are a data flow diagram illustrating a method for changing the compression format of a media stream.
Figure 9B:
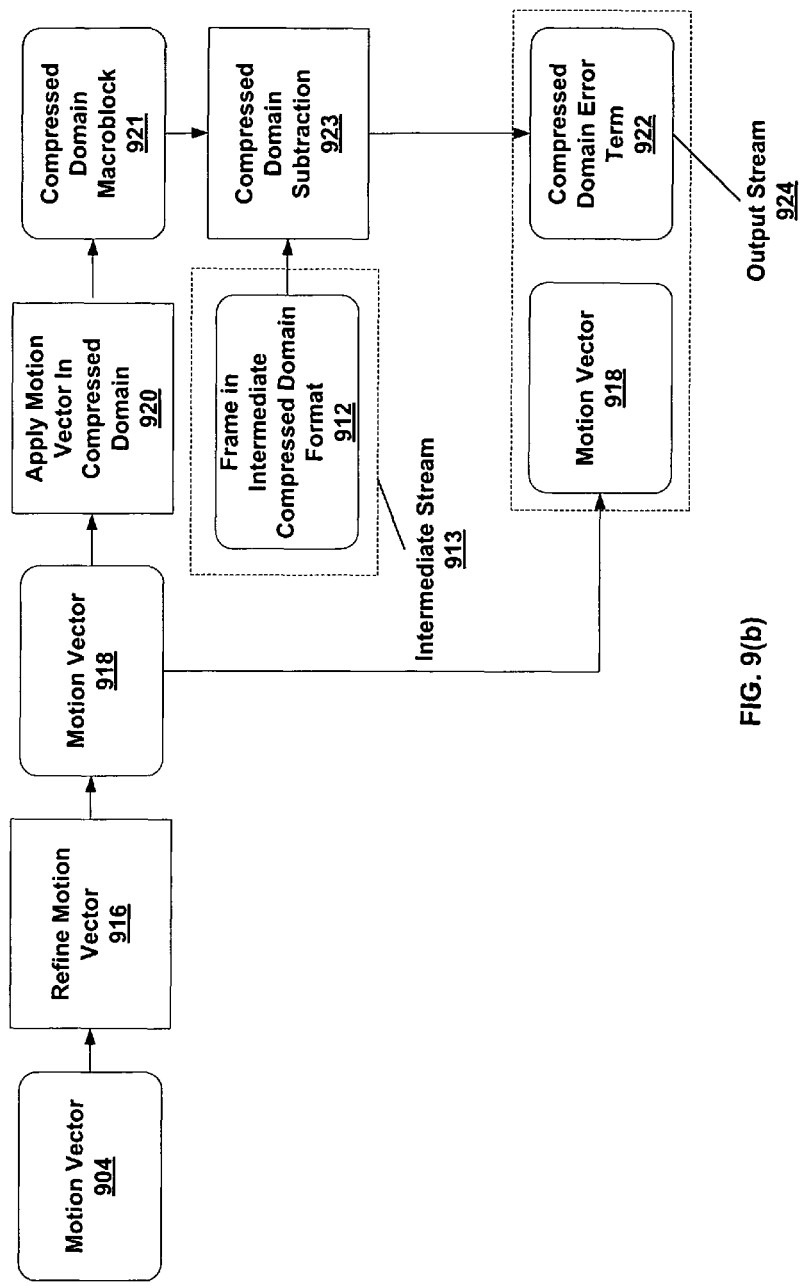

FIGS. 9(*a*) and 9(*b*) are a data flow diagram illustrating a method for changing the compression format of a media stream. According to one embodiment of the present invention, the method is performed in the conversion unit 220. FIG. 9(*a*) illustrates a method for converting frames of input stream 901 to frames of an intermediate compressed domain format. According to one embodiment of the present invention, the method is performed in the frame converter 310. The input stream 901 is a media stream of a first compression format, and the frames of the input stream are compressed according to the first compression format. For the purposes of illustration, the input stream is discussed as being of a generalized form common among a variety of compression formats. The methods described herein are useful for a variety of compression formats, some of which may differ from the generalized format described herein for the purposes of illustration. It will be apparent to one of skill in the art that the techniques may be applied to various compression formats without departing from the scope of the present invention.

Frames of the input stream 901 comprise a motion vector 904 and a compressed domain error term 902. The motion vector describes, generally in the spatial domain, how macroblocks from one frame are related to macroblocks of a previous or subsequent frame. The compressed domain error term 902 describes, generally in the compressed domain, how the result of the application of the motion vector 904 should be modified to improve the fidelity of the resulting frame. For example, the compressed domain error term 902 may include information related to transients not encoded in the motion vector 904.

The frame converter 310 applies 906 the motion vector 904 in the compressed domain. The frame converter 310 processes macroblocks of the previous compressed domain frame (for example, the intermediate format compressed domain frame 912) according to the directives of the motion vector 904 to produce a compressed domain macroblock 908.

The frame converter 310 performs compressed domain addition 910 on the compressed domain macroblock 908 and the compressed domain error term 902. A method for compressed domain addition, according to one embodiment of the present invention, is described herein with reference to FIG. 12. The compressed domain addition 910 results in a frame in intermediate compressed domain format 912. The intermediate stream 913 is formed by a series of frames in intermediate compressed domain format 912. Frames in the intermediate compressed domain format 912 are compressed using intraframe compression, and typically are not compressed using interframe compression. According to one embodiment of the present invention, the intermediate stream 913 also includes a series of motion vectors 904. Thus, according to one embodiment of the present invention, a frame in the intermediate compressed domain format beneficially contains the information to represent that frame without dependence on other frames, while at the same time saving space and bandwidth by containing that information in a compressed manner, for example, by storing it in the compressed domain.

FIG. 9(*b*) illustrates a method for converting frames in intermediate compressed domain format to frames of a second compression format. According to one embodiment of the present invention, the method is performed in the encoder 340. The output stream 924 is a media stream of a second compression format, and the frames of the output stream 924 are compressed according to the second compression format. For the purposes of illustration, the output stream 924 is discussed as being of a generalized form common among a variety of compression formats. The methods described herein are useful for a variety of compression formats, some of which may differ from the generalized standard described herein for the purposes of illustration. It will be apparent to one of skill in the art that the techniques may be applied to various compression formats without departing from the scope of the present invention.

According to one embodiment of the present invention, the intermediate stream 913 includes the motion vector 904, and the encoder 340 reuses the motion vector 904 from the input stream 901 for the output stream 924. Reusing the motion vector 904 beneficially reduces the computation involved in encoding the intermediate stream.

According to one embodiment of the present invention, the encoder 340 refines 916 the motion vector 904 to produce a motion vector 918. Refining 916 the motion vector 904 is beneficial for transcaling, or for handling conversions from a first compression standard to a second compression standard in which the first compression standard has different specifications for the size or definition of macroblocks than the second compression standard. For example, if the motion vectors of the first standard are not directly compatible with the motion vectors of the second standard, refining the motion vectors beneficially allows the motion vectors compliant with the second standard to be calculated efficiently. In some circumstances, the motion vector 918 may be equivalent to the motion vector 904.

The encoder 340 applies 920 the motion vector 918 in the compressed domain. The encoder 340 processes macroblocks of the previous compressed domain frame (for example, the intermediate format compressed domain frame 912) according to the directives of the motion vector 918 to produce a compressed domain macroblock 921.

The encoder 340 subtracts 923 the compressed domain macroblock 921 from the frame in intermediate compressed domain format 912 to produce a compressed domain error term 922. The frame in intermediate compressed domain format 912 may be the same as the frame in intermediate compressed domain format 912, or it may be different, for example, if a transformation, such as image enhancement or scaling, has been performed in the intermediate format compressed domain. The compressed domain error term 922 describes, generally in the compressed domain, how the result of the application of the motion vector 918 should be modified to improve the fidelity of the resulting frame. A method for subtracting 923 the compressed domain macroblock 921 from the frame in intermediate compressed domain format 912 is described herein with reference to FIG. 12. The encoder 340 includes the motion vector 918 and the compressed domain error term 922 in the output stream 924.

Figure 10:
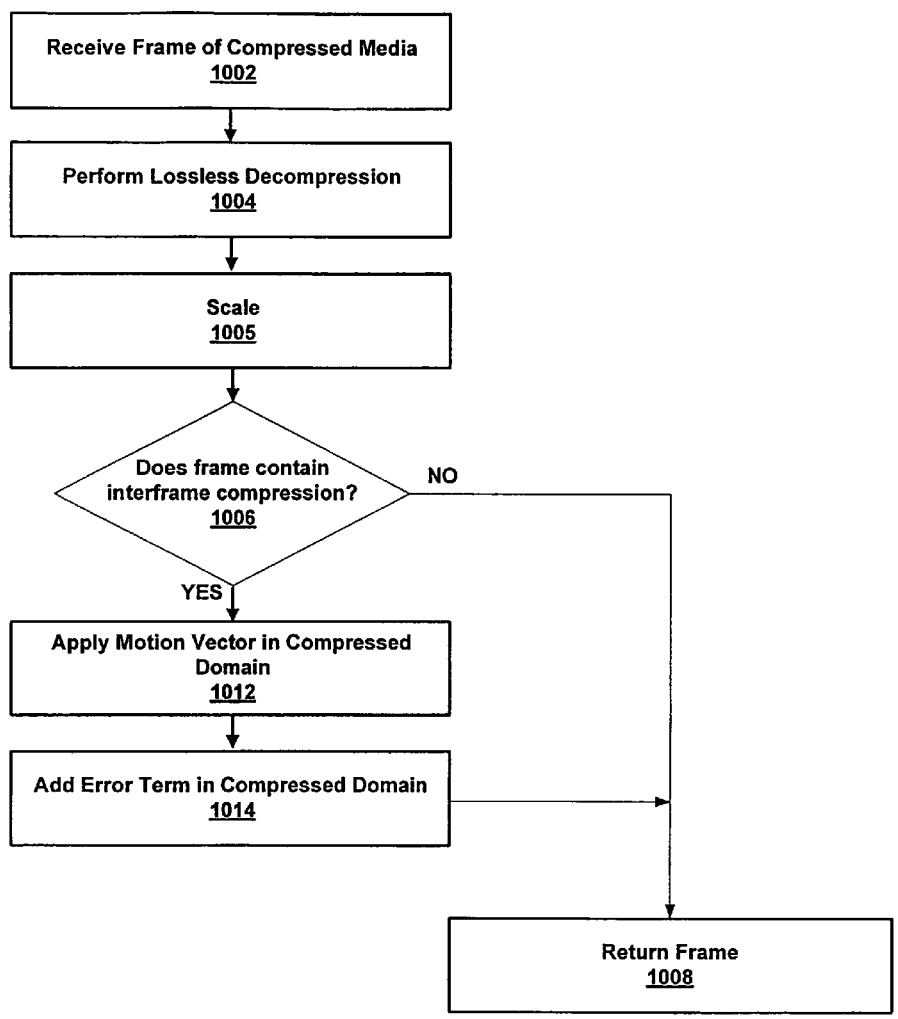
FIG. 10 is a flow chart illustrating a method for processing in the compressed domain a frame of media of a first format to produce a frame of media in an intermediate compressed domain format.

FIG. 10 is a flow chart illustrating a method for processing in the compressed domain a frame of media of a first format to produce a frame of media in an intermediate compressed domain format. According to one embodiment of the present invention, the method is performed by the frame converter 310.

The frame converter 310 receives 1002 a frame of compressed media. The frame converter 310 performs 1004 lossless decompression on the frame of compressed media. For example, the frame converter 310 reverses entropy encoding or other compression techniques as prescribed by the format of the compressed media. The frame converter 310 scales 1005 the samples of the compressed media. For example, the frame converter 310 inverse quantizes the samples according to scale factors prescribed by the format of the compressed media or as contained in the frame.

The frame converter 310 determines 1006 if the frame contains interframe compression. If the frame does not contain interframe compression, motion compensation is not implemented and the frame converter 310 returns 1008 the frame with intraframe compression intact. For example, if the frame is a reference frame (such as an I frame), generally no motion vectors will be applied. If the frame does contain interframe compression, the frame converter 310 applies motion vectors 1012 in the compressed domain. The frame converter 310 adds 1014 an error term in the compressed domain, resulting in the decompression of interframe compression. The frame converter 310 returns 1008 the frame with intraframe compression intact.

Figure 11:
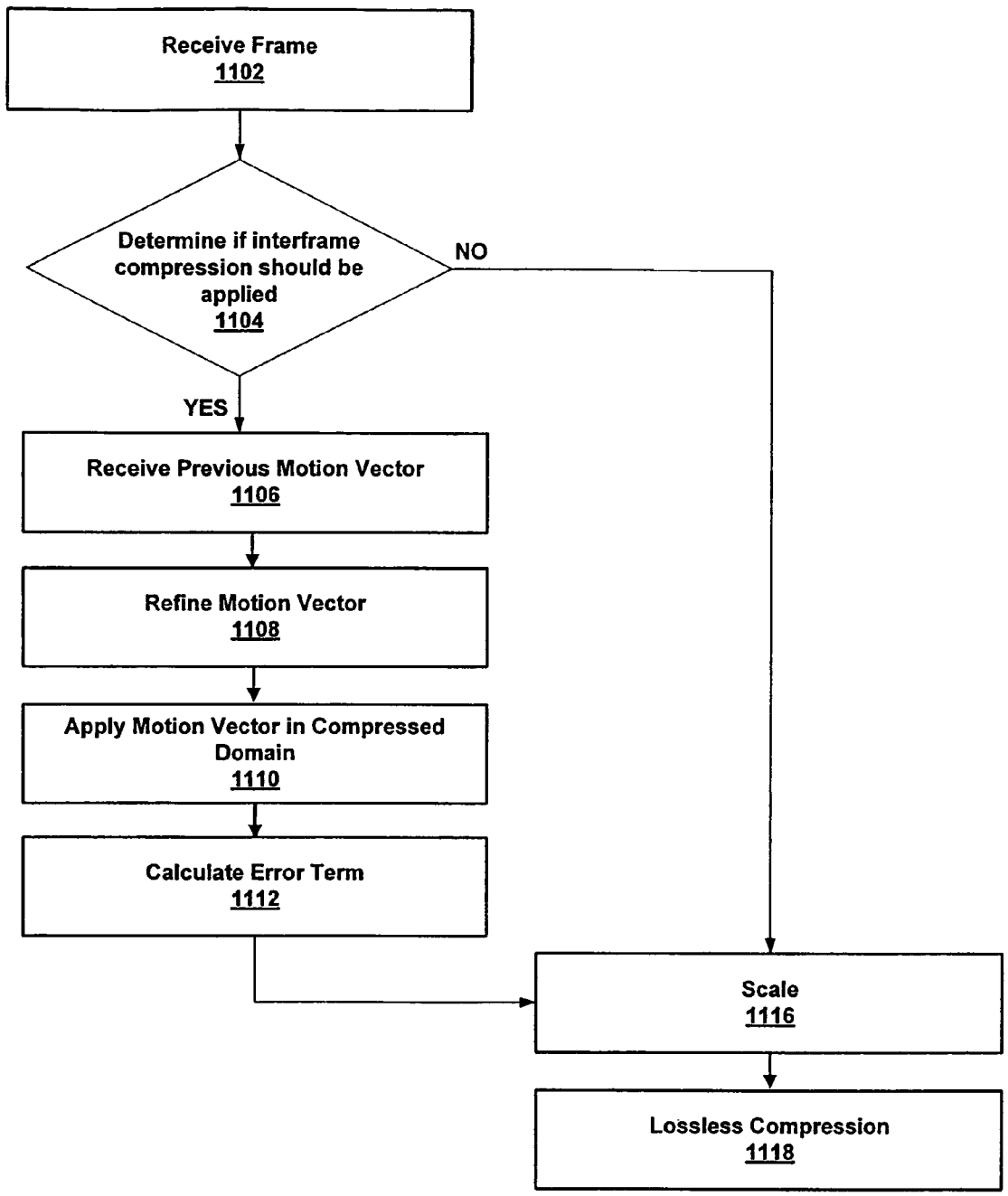
FIG. 11 is a flow chart illustrating a method for processing in the compressed domain a frame of media in an intermediate compressed domain format to produce a frame of media in a second format.

FIG. 11 is a flow chart illustrating a method for processing in the compressed domain a frame of media in an intermediate compressed domain format to produce a frame of media in a second format. According to one embodiment of the present invention, the method is performed by the encoder 340.

The encoder 340 receives 1102 a frame in an intermediate compressed domain format. For example, the encoder 340 may receive a frame with intraframe compression intact. The frame received 1102 by the encoder 340 may be analogous to the frame returned 1008 by the frame converter 310, or it may be a modified version of the frame returned 1008 by the frame converter 310.

The encoder 340 determines 1104 if interframe compression should be applied. If the encoder 340 determines 1104 that interframe compression should be applied, the encoder 340 proceeds to scaling 1116 the frame. Not applying interframe compression to a frame may be desirable, for example, if the frame originated from a reference frame in the input stream 901, or if it the output stream 924 is of a compression format that does not use interframe compression.

If the encoder 340 determines 1004 that interframe compression should be applied, the encoder receives 1106 the associated motion vector. Optionally, the encoder 340 refines 1108 the motion vector. Refining the motion vector 1108 is beneficial for example, in cases in which the frame has been image enhanced or transcaled. If no motion vector is available for a frame, refining 1108 may include generating motion vectors for the frame.

The encoder applies 1110 the motion vector in the compressed domain and calculates 1112 an error term.

The encoder scales 1116 the frame and performs lossless compression 1118. For example, the encoder may quantize coefficients of the frame and perform entropy coding in accordance with the compression format of the output stream 924.

Figure 12:
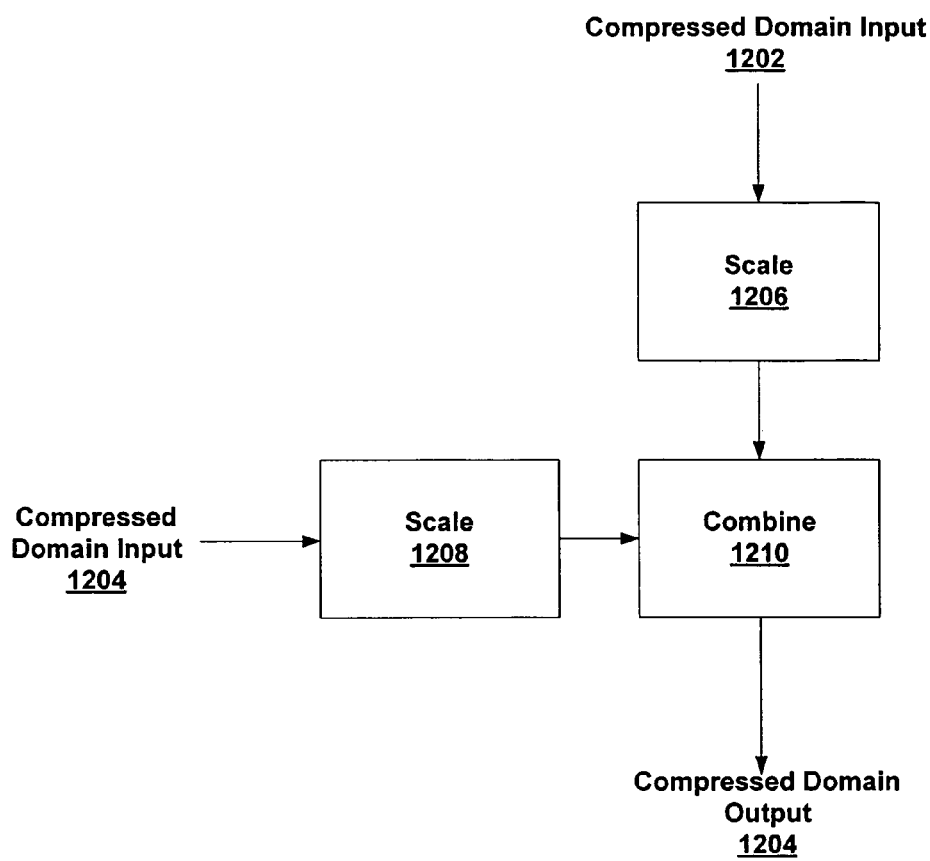
FIG. 12 is a block diagram illustrating a method for combining two inputs in the compressed domain.

FIG. 12 is a block diagram illustrating a method for combining two inputs in the compressed domain. The method for combining two inputs is beneficial for implementing the frame converter 310 and the decoder 340. A compressed domain input 1202 is scaled 1206 and combined with a scaled 1208 compressed domain input 1204 producing a compressed domain output 1204. A compressed domain technique such as the one illustrated in FIG. 12 may be useful in a variety of application. For example, the frame converter 310 may use the method described herein for inverse quantizing the compressed domain macroblock 908 and the compressed domain error term 902 and adding the two results in the compressed domain to produce a frame in intermediate compressed domain format. Alternatively, the encoder 340 may use the method described herein for quantizing the compressed domain macroblock 921 and the frame in intermediate format compressed domain format 912 and subtracting the result of one from another to produce a compressed domain error term. (The scale 1208, for example, may be used to negate the compressed domain input 1204 to produce a subtraction.)

Alternatively, the method for combining two inputs is useful for operations such as efficiently blitting in the compressed domain a character onto an image, or layering in the compressed domain an image on top of another image. For example, using methods such as those described herein, a graphic can be layered on top of video in the compressed domain. Multiple images can be beneficially layered at multiple levels, on top or underneath video images and in any order.

According to one embodiment of the present invention, the compressed domain input 1202 is a compressed domain representation of an image. The image can be, for example, a graphic or a frame of video, but other examples will be apparent to one of skill in the art. The compressed domain input 1204 is a compressed domain representation of a character for which it is desired to superimpose on top of the image. The character can be, for example, a graphic or another frame of video, but other examples will be apparent to one of skill in the art. The scale function 1206 is a multiply by some factor α and the scale function 1208 is a multiply by some factor 1−α. The resulting multiplications and addition results in a compressed domain output 1204 that is the compressed domain representation of either the character superimposed on the image or the image layered on top of the character. Using the method described herein to blit characters (or layer characters or video) in the compressed domain performs blitting or layering operations efficiently, allows for the reuse of motion compensation hardware, and improves over traditional techniques requiring a transformation of the input image to the spatial domain.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention. For example, the systems and methods of the present invention can be used to establish a connection between a client computer and a server computer using any type of stateless protocol.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for changing a media stream of a first compression format to a media stream of a second compression format, the method executed by a processor and comprising:

receiving a media stream of the first compression format, said media stream of the first compression format comprising a frame of media of the first compression format, the frame of media of the first compression format comprising a first motion vector, a first error term and a plurality of compression parameters;

converting the media stream of the first compression format to an intermediate media stream of an intermediary compression format in a compressed domain, the intermediate media stream comprising a plurality of frames in the intermediary compression format, and the frames in the intermediary compression format compressed using intraframe compression without motion compensation;

generating a media stream of the second compression format from the intermediate media stream, the media stream of the second compression format comprising a frame in the second compression format and having a second motion vector and a second error term; and sending the media stream of the second compression format over a computer network.

2. The method of claim 1, wherein converting the media stream of the first compression format comprises:
extracting, in the compressed domain, the first motion vector, the first error term and the plurality of compression parameters.

3. The method of claim 1, wherein generating the media stream of the second compression format comprises:
processing frames of the intermediate media stream in either a compressed domain or a spatial domain.

4. The method of claim 1, further comprises:
enhancing the frames of the intermediate media stream in the spatial domain;
scaling the frames of the intermediate media stream in the spatial domain;
adjusting bit rate of the intermediate media stream in the spatial domain; and
encoding the frames of the intermediate media stream in either the compressed domain or the spatial domain.

5. The method of claim 4, wherein enhancing the frames of the intermediate media stream comprises:
removing at least one of noise, blockiness and other visual artifacts of at least one of the frames of the intermediate media stream, wherein the noise, blockiness and other visual artifacts of a frame degrade the visual quality of the frame.

6. The method of claim 1, wherein further comprises converting the first motion vector to a form compatible with the second compression format.

7. The method of claim 1, wherein the first compression format is different from the second compression format.

8. The method of claim 1, wherein the compressed domain is a frequency domain.

9. The method of claim 1, wherein the media stream of the first compression format comprises a video stream.

10. The method of claim 1, wherein the media stream of the first compression format comprises an audio stream.

11. The method of claim 1, wherein multiple media streams are received simultaneously.

12. The method of claim 1, wherein the media stream of the first compression format and the media stream of the second compression format are formatted according to a format selected from the group consisting of MPEG 2, VC-1, RealVideo, DV, AVS, MPEG 4, JPEG, H.263, and H.264.

13. A system for changing a media stream of a first compression format to a media stream of a second compression format, the system comprising:

a frame converter configured to receive a media stream of the first compression format, said media stream of the first compression format comprising a frame of media of the first compression format, the frame of media of the first compression format comprising a first motion vector, a first error term and a plurality of compression parameters;

the frame converter further configured to convert the media stream of the first compression format to an intermediate media stream of an intermediary compression format in a compressed domain, the intermediate media stream comprising a plurality of frames in the intermediary compression format, and the frames in the intermediary compression format compressed using intraframe compression without motion compensation; and an encoder configured to generate a media stream of the second compression format from the intermediate media stream, the media stream of the second compression format comprising a frame in the second compression format and having a second motion vector and a second error term.

14. The system of claim 13, wherein the converter is further configured to:
extract, in the compressed domain, the first motion vector, the first error term and the plurality of compression parameters.

15. The system of claim 13, wherein the encoder is further configured to:
process frames of the intermediate media stream in either a compressed domain or a spatial domain.

16. The system of claim 15, wherein the encoder is further configured to:
adjust bit rate of the intermediate media stream in the spatial domain; and
encode the frames of the intermediate media stream in either the compressed domain or the spatial domain.

17. The system of claim 13, further comprises:
an image enhancer configured to enhance the frames of the intermediate media stream in the spatial domain; and
a scaler configured to scale the frames of the intermediate media stream in the spatial domain.

18. The system of claim 17, wherein the image enhancer is further configured to:
remove at least one of noise, blockiness and other visual artifacts of at least one of the frames of the intermediate media stream, wherein the noise, blockiness and other visual artifacts of a frame degrade the visual quality of the frame.

19. A non-transitory computer-readable storage medium storing executable computer program code for changing a media stream of a first compression format to a media stream of a second compression format, the computer-readable storage medium comprising computer program code for:

receiving a media stream of the first compression format, said media stream of the first compression format comprising a frame of media of the first compression format, the frame of media of the first compression format comprising a first motion vector, a first error term and a plurality of compression parameters;

converting the media stream of the first compression format to an intermediate media stream of an intermediary compression format in a compressed domain, the intermediate media stream comprising a plurality of frames in the intermediary compression format, and the frames in the intermediary compression format compressed using intraframe compression without motion compensation;

generating a media stream of the second compression format from the intermediate media stream, the media stream of the second compression format comprising a frame in the second compression format and having a second motion vector and a second error term; and sending the media stream of the second compression format over a computer network.

20. The non-transitory computer-readable storage medium of claim 19, further comprises computer program code for:

enhancing the frames of the intermediate media stream in the spatial domain;

scaling the frames of the intermediate media stream in the spatial domain;

adjusting bit rate of the intermediate media stream in the spatial domain; and encoding the frames of the intermediate media stream in either the compressed domain or the spatial domain.

21. The non-transitory computer-readable storage medium of claim 20, wherein the computer program code for enhancing the frames of the intermediate media stream comprises computer program code for:

removing at least one of noise, blockiness and other visual artifacts of at least one of the frames of the intermediate media stream, wherein the noise, blockiness and other visual artifacts of a frame degrade the visual quality of the frame.

* * * * *